(«12») United States Patent
Fayt

(10) Patent No.: US 7,914,070 B2
(45) Date of Patent: Mar. 29, 2011

(54) METHOD FOR FITTING A BUMPER SHELL AROUND LIGHT UNITS STAY FOR A BUMPER SHELL AND HEADLIGHT UNIT FOR MOTOR VEHICLES

(75) Inventor: Arnold Fayt, Jujurieux (FR)

(73) Assignee: Compagnie Plastic Omnium, Lyons (FR)

( * ) Notice: Subject to any disclaimer, the term of this patent is extended or adjusted under 35 U.S.C. 154(b) by 222 days.

(21) Appl. No.: 11/920,117

(22) PCT Filed: May 12, 2006

(86) PCT No.: PCT/FR2006/001078
§ 371 (c)(1),
(2), (4) Date: Dec. 28, 2007

(87) PCT Pub. No.: WO2006/120359
PCT Pub. Date: Nov. 16, 2006

(65) Prior Publication Data
US 2009/0008818 A1    Jan. 8, 2009

(30) Foreign Application Priority Data
May 12, 2005   (FR) ...................................... 05 04793

(51) Int. Cl.
*B62D 25/08* (2006.01)
(52) U.S. Cl. .............................. 296/193.09; 296/187.09
(58) Field of Classification Search ............. 296/193.01, 296/187.09, 193.04, 193.09, 193.1, 203.02, 296/29; 293/115, 121, 102, 120
See application file for complete search history.

(56) References Cited

U.S. PATENT DOCUMENTS

| 5,066,057 | A | | 11/1991 | Furuta et al. | |
|---|---|---|---|---|---|
| 5,123,695 | A | * | 6/1992 | Kanemitsu et al. | 296/193.09 |
| 5,358,304 | A | * | 10/1994 | Kanemitsu et al. | 296/193.09 |
| 6,357,821 | B1 | * | 3/2002 | Maj et al. | 296/193.09 |
| 6,523,886 | B2 | * | 2/2003 | Hoffner et al. | 296/203.02 |
| 6,626,483 | B2 | * | 9/2003 | Ozawa et al. | 296/193.09 |
| 6,805,400 | B2 | * | 10/2004 | Bruderick et al. | 296/193.09 |
| 6,880,882 | B2 | * | 4/2005 | Andre et al. | 296/193.09 |
| 6,896,320 | B2 | * | 5/2005 | Kropfeld | 296/203.01 |
| 6,923,495 | B2 | * | 8/2005 | Kishikawa et al. | 296/193.09 |
| 6,951,365 | B2 | * | 10/2005 | Chase et al. | 296/187.03 |
| 7,014,257 | B2 | * | 3/2006 | Lazzeroni et al. | 296/203.02 |
| 7,036,873 | B2 | * | 5/2006 | Pommeret et al. | 296/191 |
| 7,048,326 | B2 | * | 5/2006 | Yasui | 296/203.02 |
| 7,097,239 | B2 | * | 8/2006 | Lazzeroni | 296/203.01 |
| 7,188,892 | B2 | * | 3/2007 | Tazaki et al. | 296/193.09 |

(Continued)

FOREIGN PATENT DOCUMENTS

DE   100 42 562 A1   3/2002

(Continued)

*Primary Examiner* — Glenn Dayoan
*Assistant Examiner* — Gregory Blankenship
(74) *Attorney, Agent, or Firm* — Oliff & Berridge, PLC

(57) ABSTRACT

The present invention relates to a shaping method of shaping a bumper skin of plastics material around at least two light units of a motor vehicle, with the help of reinforcement comprising a certain number of portions, the skin having zones for covering the various portions of the reinforcement, each portion of the reinforcement including means for fastening it to one of the light units in a predetermined position. The portions of the reinforcement are initially fastened to the corresponding zones of the bumper skin, and then the portions of the reinforcement are assembled to the light units. The present invention also provides reinforcement and a front unit for a vehicle.

12 Claims, 1 Drawing Sheet

U.S. PATENT DOCUMENTS

Figure 1:
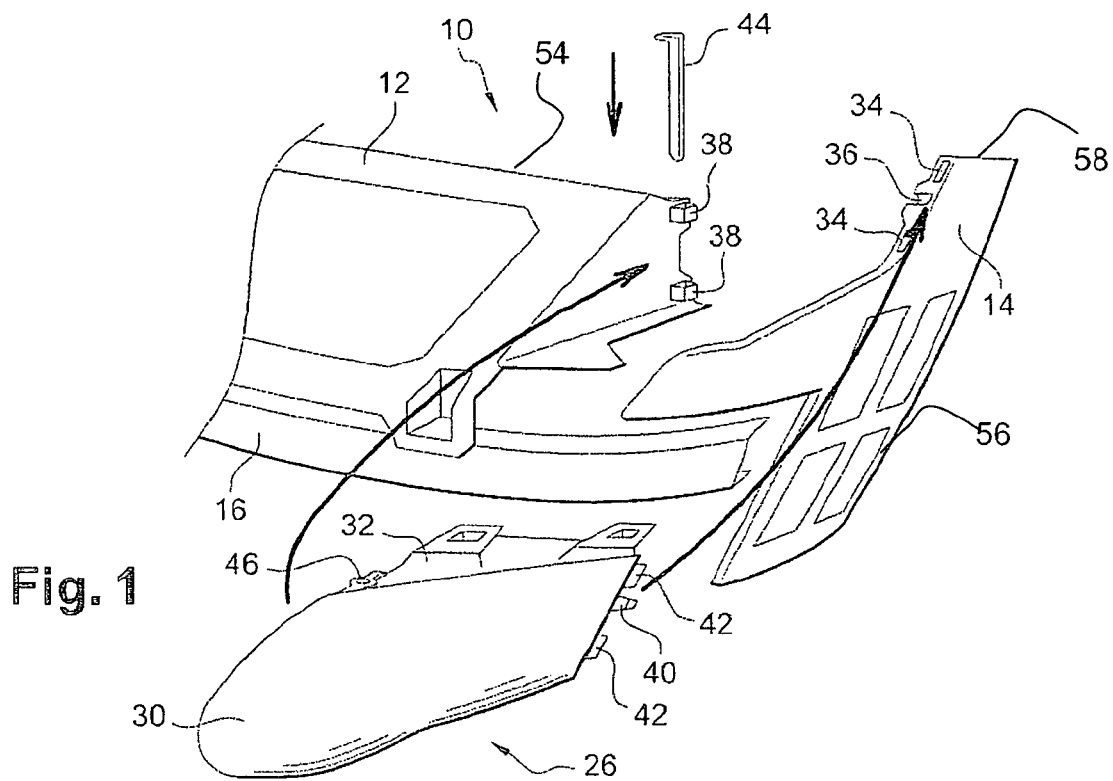

| | | | |
|---|---|---|---|
| 7,258,385 B2 | 8/2007 | Andre et al. | |
| 7,270,368 B2 * | 9/2007 | Aonuma et al. | 296/203.02 |
| 7,347,489 B2 * | 3/2008 | Ziaja et al. | 296/193.03 |
| 7,377,579 B2 * | 5/2008 | Kwon | 296/193.09 |
| 7,419,208 B2 * | 9/2008 | Sub | 296/193.09 |
| 7,497,289 B2 * | 3/2009 | Kwun et al. | 180/68.4 |
| 7,506,919 B2 * | 3/2009 | Fayt et al. | 296/193.09 |
| 7,540,550 B1 * | 6/2009 | Huber et al. | 296/29 |
| 2002/0073529 A1 | 6/2002 | Yustick | |

FOREIGN PATENT DOCUMENTS

| | | |
|---|---|---|
| EP | 0 437 781 A2 | 7/1991 |
| EP | 0 853 032 A1 | 7/1998 |
| FR | 2 838 094 A1 | 10/2003 |

\* cited by examiner

METHOD FOR FITTING A BUMPER SHELL AROUND LIGHT UNITS STAY FOR A BUMPER SHELL AND HEADLIGHT UNIT FOR MOTOR VEHICLES

The present invention relates to a method of shaping a plastics bumper skin around light units, to bumper skin reinforcement, and to a motor vehicle front unit.

It is known that mounting bodywork elements to the front of a vehicle requires positioning to be very accurate. For reasons of appearance, the glass of the lights, the bumper skin, and the fenders must present appropriate clearance and be mounted flush.

To facilitate positioning, FR 2 838 094 discloses a support suitable for shaping the bumper skin relative to the glass of the light and other bodywork elements so as to ensure that the bodywork element assembly is properly positioned before said assembly is mounted on the vehicle. The support optionally includes means for connecting to the fenders, so that it extends from one fender to the other.

The problem consists in that the support extends over a great length, so it needs to have dimensions similar to those of the skin. Since those two parts are both large, dispersions are likewise large and they become difficult to couple together.

The present invention seeks to remedy that drawback by providing a method of shaping the bumper skin in which the coupling between the skin and the support, or reinforcement, is improved, thereby ensuring more satisfying positioning of the bodywork elements.

To this end, the invention provides a shaping method for shaping a bumper skin of plastics material around at least two light units of a motor vehicle, with the help of reinforcement comprising a certain number of portions, the skin having zones for covering the various portions of the reinforcement, each portion of the reinforcement including means for fastening it to one of the light units in a predetermined position, the method being characterized in that the portions of the reinforcement are initially fastened to the corresponding zones of the bumper skin, and then the portions of the reinforcement are assembled to the light units.

Preferably, the reinforcement is no longer constituted by a single large part of size similar to that to the skin, but of a plurality of distinct parts that are smaller, each constituting a portion of the reinforcement, the smaller parts being less subject to dispersion in dimensions. In another embodiment, the various portions are made as a single piece, but they are connected together by flexible connections. Whatever fabrication technique is used, no longer having a single large part of shape that needs to be accurately monitored remedies the above-mentioned problem.

In addition, the skin is positioned very accurately around the light units, via each of the portions of the reinforcement, but without that causing deformations to become visible at its surface, since the positioning stresses are shared between the portions of the reinforcement. During implementation of the method, it is the light units that determine the positioning of the portions of the reinforcement, with the skin then adapting to that positioning by small variations in its curvature.

By definition, it should be observed that a light unit is constituted by a housing together with a glass. During mounting, it is desired to obtain very accurate clearances and flush connections between the glass of each of the lights and the neighboring bodywork parts. Since the glasses and housings of the light units are generally bonded together by adhesive, it is preferable to position the bodywork part relative to the glasses, while fastening them to the housings via the portions of the reinforcement. The means for fastening the reinforcement to the light unit thus co-operate with fastener means formed on the glasses and/or the housings.

In an embodiment of the invention, once the various portions of the reinforcement have been assembled to the light units, those portions are fixed relative to one another by connections so as to allow the glasses and/or housings of the light units to be removed. It is thus possible to shape the bumper skin so as to position it properly relative to the glasses, without said positioning being lost whenever the light units are dismantled, which can make assembly of the vehicle in the factory easier, and can also make it easier to repair the light units. The connections are optionally made by heat-sealing, once the portions of the reinforcement have been assembled together.

The invention also provides reinforcement made up of a plurality of portions for implementing the above-described method.

Preferably, the reinforcement comprises a central portion and two side portions constituting reinforcing members for bumper overriders. These bumper overrider reinforcing members covered by the two ends of the skin are not secured directly to the central portion of the reinforcement, so they are free to follow the positioning imposed by the glasses of the light units, independently of the positioning imposed by the central portion. This separation thus enables deformation to be better distributed over the entire surface of the skin.

Also preferably, the central portion includes means for positioning it relative to a front end module top cross-member, or indeed relative to a hood or to a hood lock, and the side portions include means for positioning them relative of the fenders of the vehicle. Thus, each of the portions of the reinforcement is positioned accurately relative to the vehicle body and it is easier to shape them than when the reinforcement is constituted by a single unit of size similar to that of the skin. Each of these portions thus includes means for putting it in a reference position, in particular in the transverse direction of the vehicle.

In an embodiment, the overrider reinforcing members include bumper skin pressers.

Optionally, the reinforcement may include means for supporting vehicle fenders, optionally fender pressers, enabling the fenders to be positioned accurately relative to the skin.

In an embodiment, the reinforcement includes an impact absorber.

The invention also provides a front unit for a motor vehicle, the front unit comprising a geometrical module comprising a bumper skin, light units, and reinforcement as described above, fitted onto a structural module including in particular the front end module and the bumper beam of the vehicle. Such a module enables the skin to be positioned accurately relative to the light unit off the vehicle assembly line, and then enables the entire front assembly to be fitted to the front of the structural module.

Figure 2:
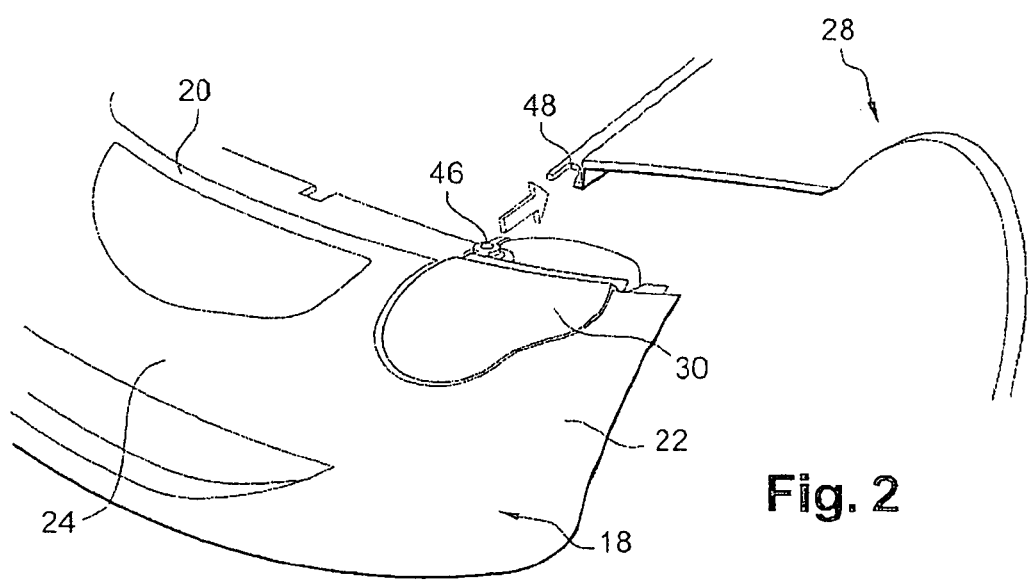

The invention can be better understood on reading the following description given purely by way of example and made with reference to the drawings, in which:

FIG. 1 is a diagram of the left portion of a reinforcement of the invention assembled to a light unit; and FIG. 2 is a diagram showing a front block of the invention being mounted.

As shown in FIG. 1, reinforcement 10 of the invention comprises a plurality of portions, constituted by distinct parts made of plastics material: a central portion 12; two side portions 14; and an impact absorber 16. All of these portions of the reinforcement 10 are designed to be covered by a bumper skin 18, or bumper shield, as shown in FIG. 2. The figures show mainly the left-hand portion of the front block, which block is generally symmetrical about the longitudinal direction of the vehicle.

When the reinforcement 10 is fastened to the skin 18, the central portion 12 is covered by a zone 20 of the skin that receives a radiator grille. The side portions 14, which are overrider reinforcing members, are covered by the bumper overriders 22. The absorber 16 is covered by a zone 24 of the skin.

The reinforcement 10 serves to position all of the bodywork parts at the front of the vehicle appropriately. These bodywork parts comprise a skin 18, two light units 26, and two front fenders 28. More precisely, a light unit 26 comprises a glass 30 and a housing 32, and the bodywork parts are positioned relative to the glass 30.

To ensure that all of the parts are properly positioned, the skin 18 is shaped around the two glasses 30. For this purpose, the portions 12 and 14 of the reinforcement 10 include means for fastening to the glass 30 and to the housing 32 for the purpose of positioning the reinforcement in a predetermined position relative to the light unit 26. These fastener means comprise slots 34 and notches 36 formed on the top portions of the overrider reinforcements 14, and also eyelets formed in the central portion 12.

The shaping method is performed as follows. Once the portions 12, 14, and 16 of the reinforcement 10 have been fastened to the corresponding zones of the skin 18, e.g. by adhesive or heat-sealing, the portions 12, 14 of the reinforcement are assembled with the light unit 26. More precisely, the means 34 and 36 of the overrider reinforcements 14 are caused to co-operate with a peg 40 and tongues 42 that are formed on the glass 30 of the light. In parallel, the eyelets 38 are aligned with eyelets formed in the housing 32 of the light unit, so as to enable a pin 44 to be inserted into these eyelets. The central portion 12 is also provided with fastener means (not shown), similar to the means 34 and 36, and suitable for co-operating with a peg and with tongues arranged under the housing or the glass, opposite from the peg 40 and the tongues 42.

Because of all of this indexing arranged on the portions 12, 14 of the reinforcement and on the light unit 26, it is possible to "drag" the portions of the reinforcement so as to shape the skin around the two light units.

It should be observed that for better fastening of the reinforcement 10 to the bumper skin 18, it is possible to provide the portions 12 and 14 with bumper skin pressers 56.

Once the reinforcement and the skin have been assembled to the light unit, the geometrical module constituting by these elements can be mounted on the vehicle body including the fenders and a structural module. The structural module has a front end module, a radiator, and one or two impact beams (high and low) of the vehicle (not shown). For this purpose, the housing 32 of the light unit includes positioning means constituted by a peg 46 for co-operating with a notch 48 formed in the fender 28. It also includes means for fastening to the vehicle, e.g. to the front end module, in order to be positioned relative to the hood or to the hood lock.

In an embodiment, it is the members 12 and 14 of the reinforcement that include positioning means 54 for positioning relative to the vehicle body, the central portion 12 of the reinforcement being positioned relative to the top cross-member of the front end module, and the side portions 14 relative to the vehicle fenders.

In an embodiment, the reinforcement 10 has zones that go beyond the bumper overriders, serving as supports for the vehicle fenders, e.g. fender pressers 58.

In another embodiment, once the reinforcement has been assembled to the light units, the various portions 12, 14, 16 overlap and they are fixed relative to one another, e.g. by heat-sealing. This enables them to remain positioned relative to one another even if the light unit 26 is removed from the vehicle.

Finally, it should be observed that the present invention is not limited to the embodiments described above.

The invention claimed is:

1. A method for shaping a bumper skin of plastics material around at least two light units of a motor vehicle, with the help of a reinforcement comprising at least a central portion and two side portions, the skin having zones for covering the various portions of the reinforcement, each portion of the reinforcement including means for fastening it to one of the light units in a predetermined position, the central portion including means for positioning the central portion relative to a structural module top cross-member, the method comprising initially fastening the central and two side portions of the reinforcement directly to the corresponding zones of the bumper skin, and then assembling the portions of the reinforcement to the light units.

2. A shaping method according to claim 1, during which, once the various portions of the reinforcement have been assembled relative to one another, they are themselves fixed together by connections so as to enable the light units to be withdrawn.

3. A shaping method according to claim 2, wherein the connections are made by heat-sealing.

4. A reinforcement for attaching a bumper skin of plastics material around at least two lights of a motor vehicle, the reinforcement comprising:
a central portion and two side portions, the central portion being positionable between the at least two lights, the two side portions being positionable on opposite sides of respective ones of the at least two lights;
a first fastener portion configured to fasten the central portion to one of the lights in a predetermined position;
a second fastener portion configured to fasten at least one of the two side portions to one of the lights in a predetermined position; and
a positioning portion configured to position the central portion relative to a structural module top cross-member, wherein
the central and two side portions each are configured to be directly fastened to corresponding zones of the bumper skin to thereby be covered by the bumper skin.

5. Reinforcement according to claim 4, comprising a plurality of separated parts.

6. Reinforcement according to claim 4, wherein the various portions are made as a single piece and are connected together by flexible connections.

7. Reinforcement according to claim 4, wherein the central portion and two side portions constituting bumper overrider reinforcements.

8. Reinforcement according to claim 7, wherein the side portions include positioning means for positioning them relative to vehicle fenders.

9. Reinforcement according to claim 7, wherein the overrider reinforcing members include bumper skin pressers.

10. Reinforcement according to claim 4, further including means for supporting vehicle fenders.

11. Reinforcement according to claim 4, further including an impact absorber.

12. A motor vehicle front unit comprising a geometrical module comprising a bumper skin, light units, and the reinforcement according to claim 4, fitted onto a structural module that includes a front end module and a bumper beam of a vehicle.

* * * * *